July 7, 1936.   C. B. RUTHERFORD   2,046,430
INSECT TRAP
Filed April 26, 1935
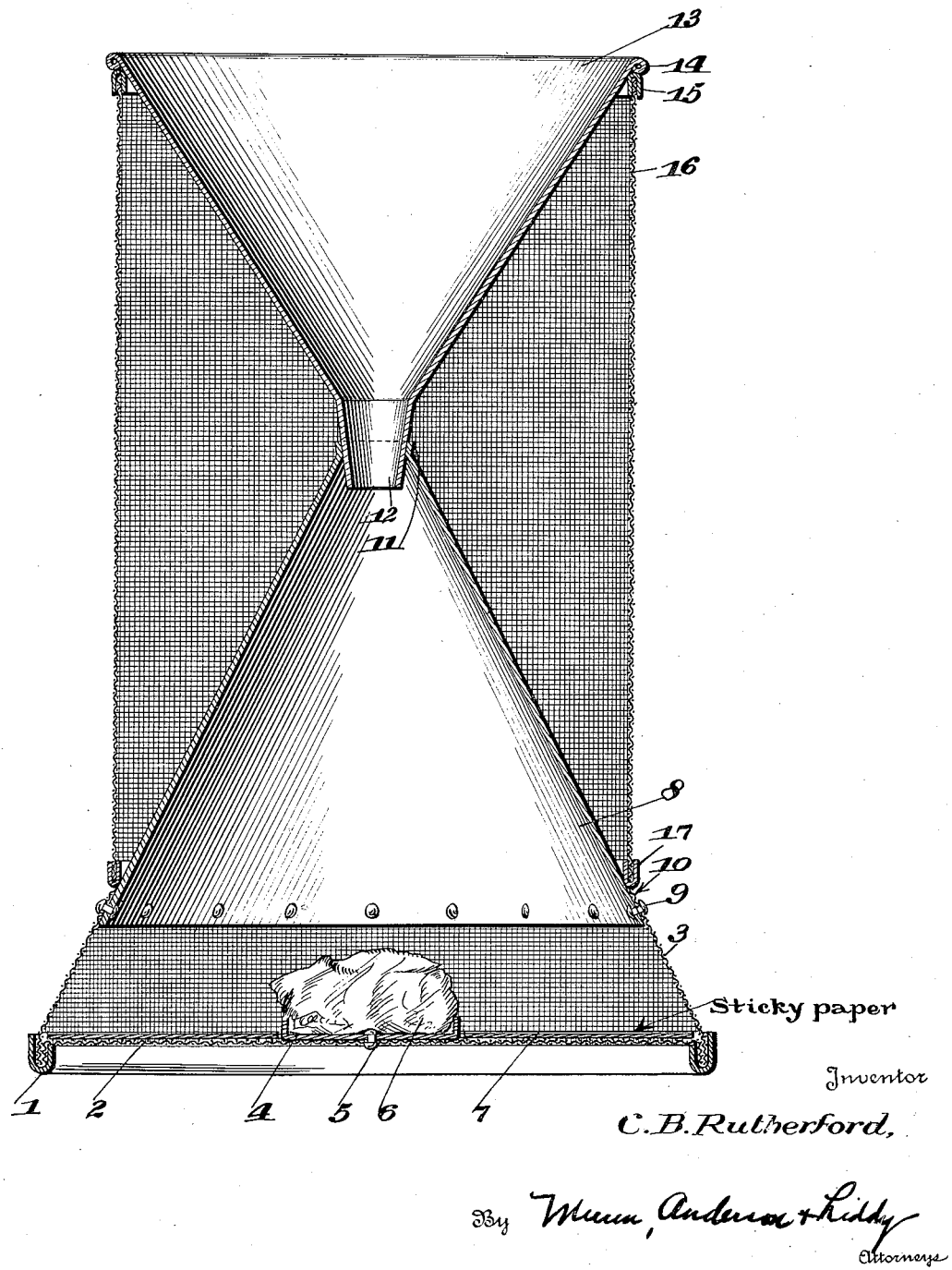
Inventor
C. B. Rutherford, Patented July 7, 1936

2,046,430

UNITED STATES PATENT OFFICE 2,046,430

INSECT TRAP

Claude B. Rutherford, Elizabethtown, Pa.

Application April 26, 1935, Serial No. 18,452

4 Claims. (Cl. 43—107)

This invention relates to improvements in insect traps, and its objects are as follows.—

First, to provide a trap which is particularly intended for trapping roaches but which is not confined to this purpose, it being useable for trapping any kind of insect which can be enticed by bait.

Second, to provide a trap which has a removable bottom which is used, in part, to support a sheet coated with a sticky substance, said bottom being surrounded by a wire screen wall which virtually confines the insects to the sticky area so as to insure their becoming entangled previously to the removal of the bottom and disposal of the sticky sheet.

Third, to provide an insect trap in which is combined a wire screen outer wall which makes it easy for the insects to crawl upon, and a sheet metal (or other material) top funnel, the slippery surface of which will tend to prevent the insects from obtaining a foothold and for that reason precipitate them into the receiving compartment after they crawl over the rim of the outer wall.

Fourth, to provide a removable clip by which to connect the removable bottom to the foregoing wire screen wall, said clip either being made integral with the bottom or separate therefrom.

Fifth, to provide an insect trap which includes an interfitted truncated cone and funnel of an hour-glass shape, the interfitted mouth and spout of these being frictionally held so as to secure the otherwise loose outer screen wall in a surrounding position.

In the drawing the view is a central vertical section of the insect trap.

The invention comprises a clip 1 which is U-shaped in cross section and circular in form, although it will be made in other forms in the event of the trap having a cross-sectional shape other than circular. The clip contains the margins of a removable screen bottom 2 and a wire screen wall 3, and by containing these margins connects the bottom with the wall so as to hold the two together. The bottom 2 is removed by removing the clip, and to this end the bottom may be made integral with the clip.

A bait pan or other bait-holding device 4 is riveted to the bottom 2 at 5. This device holds a quantity of bait 6, preferably poisoned. A sheet of sticky paper 7 is laid on the bottom 2, and it has a central hole so that the device 4 projects through. The paper sheet, in this instance in the form of a disc, virtually covers the bottom 2, the wire screen wall 3 thereby confining the insects to the sticky area so as to insure their becoming entangled. The bait 6 is only an apparent refuge, the tendency of insects falling thereon being to crawl off onto the sticky paper.

A truncated cone 8 is riveted or otherwise secured at 9 to the upper part of the confining wall 3. The screen wire of the latter is preferably applied to the outside so that the margin 10 of the wire forms a stop. The mouth 11 of the cone 8 is flared so as to more firmly contain the spout 12 of a funnel 13, said mouth and spout also being identified as interfitted necks. The cone 8 and funnel 13 comprise two oppositely flared conical members defining an hour-glass shape, the interfitted mouth 11 and spout 12 providing a passageway from the upper member to the lower member. These members are preferably made of sheet material, the slippery surface of which tends to prevent the insects from obtaining a foothold. This is especially true in the instance of the funnel 13, the sloping slippery walls of which precipitate the insects toward the spout 12 which opens into the receiving compartment defined by the cone 8, wall 3 and bottom 2.

The funnel 13 is beaded at 14 to rest on the upper end rim 15 of the outer screen wall 16. This wall is cylindrical, and because of its being made of screen wire enables the insects to crawl up. When they crawl over the upper rim 15 and into the funnel 13 they are precipitated downwardly as already explained. The lower end rim 17 of the cylindrical wall 16 rests on the margin 10, and because of the function of the margin as a stop the cylinder is prevented from canting out of the desired perpendicular position with reference to the bottom 2 when the interfitted mouth and spout 11, 12 is frictionally forced together to clamp the conical members 8, 13 against the rims 15, 17. The upper and lower rims 15, 17 are reinforced as shown.

It is to be observed that the spout 12 is tapered, and that the mouth 11 is shaped to conform. This produces a wedge fit. The funnel 13 and cylinder wall 16 are separate parts, but the wedging of the tapered spout 12 into the mouth 11 produces a tight frictional fit which insures holding the parts mentioned together.

I claim:—

1. A trap comprising a screen cylinder which has end rims, two oppositely flared conical members occupying the cylinder and respectively having said rims resting thereagainst, said members having frictionally held interfitted mouth and spout providing a passageway from one member to the other, said frictional hold clamping the conical members against said rims and securing the cylinder in place, a bottom for one of the members, a sheet of sticky paper virtually covering the entire bottom, and means connecting said one member with the bottom and providing a confining wall around the sheet of sticky paper.

2. A trap comprising means which constitutes a receiving compartment, a funnel into which insects are intended to crawl, a screen cylinder upstanding between the compartment and funnel up which insects can crawl to the funnel, and interfitted necks on and connecting the compartment and funnel, the necks being of tapered construction which when forced together wedge the cylinder in place.

3. A trap comprising a receiving compartment which consists of a truncated cone, a bottom and a wire screen wall extending from the large end of the cone to the bottom; a sheet of sticky paper virtually covering the entire bottom, said wall confining insects to the paper, a funnel which has a tapered spout fitted in the truncated cone, and a screen cylinder surrounding the cone and funnel, said cylinder being clamped in contacting position when the spout and cone are forced into interfitted relationship.

4. A trap comprising a truncated cone, a wire screen wall extending from the large end of the cone and being secured to the outside of the cone so as to form a stop, a bottom and means by which it is attached to said wall, a screen cylinder fitted on the cone, having its lower rim in contact with the cone and having its upper rim in a plane above the cone, and a funnel inserted in the cylinder to bear down on said upper rim, said funnel having a tapered spout interfitted in the cone and making a friction fit, said lower rim then resting against the stop so as to prevent canting of the cylinder.

CLAUDE B. RUTHERFORD.